US012345795B2

(12) United States Patent
Bageshwar et al.

(10) Patent No.: US 12,345,795 B2
(45) Date of Patent: Jul. 1, 2025

(54) GROUND MAP MONITOR FOR MAP-BASED, VISION NAVIGATION SYSTEMS

(71) Applicant: Honeywell International Inc., Charlotte, NC (US)

(72) Inventors: Vibhor L. Bageshwar, Rosemount, MN (US); Brian Schipper, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 463 days.

(21) Appl. No.: 17/576,711

(22) Filed: Jan. 14, 2022

(65) Prior Publication Data

US 2023/0228860 A1    Jul. 20, 2023

(51) Int. Cl.
*G01S 13/00* (2006.01)
*G01S 7/00* (2006.01)
(Continued)

(52) U.S. Cl.
CPC ............ *G01S 13/003* (2013.01); *G01S 7/006* (2013.01); *G01S 13/89* (2013.01); *G01S 13/91* (2013.01)

(58) Field of Classification Search
CPC ........ G01S 13/003; G01S 7/006; G01S 13/89; G01S 13/91
See application file for complete search history.

(56) References Cited

U.S. PATENT DOCUMENTS 8,391,294 B2 * 3/2013 Williams .............. G01S 13/723
370/400
9,873,196 B2   1/2018 Szatmary et al.
(Continued)

FOREIGN PATENT DOCUMENTS

CN     108562892 A    9/2018
WO   2020227804 A1   11/2020
(Continued)

OTHER PUBLICATIONS

Shao et al., "Target Localization Based on Bistatic T/R Pair Selection in GNSS-Based Multistatic Radar System", Remote Sensing, 13, 707, Feb. 15, 2021, pp. 1 through 15, MDPI, www.mdpi.com/journal/remotesensing.

(Continued)

*Primary Examiner* — Marcus E Windrich
(74) *Attorney, Agent, or Firm* — Fogg & Powers LLC

(57) ABSTRACT

A ground map monitor method comprises obtaining positions of communication nodes in a communications network, selecting transmission and reception nodes from the communication nodes, and measuring bistatic signals between the transmission and reception nodes to determine nominal signal performance characteristics for the bistatic signals, including reflected signal time delays, frequency shifts, and power levels. The method further comprises monitoring the bistatic signals for changes to nominal signal performance characteristics. The method uses discriminators between the nominal signal performance characteristics and a current performance level of the bistatic signals, and compares the discriminators against performance thresholds, to determine whether current signal performance characteristics have varied from their nominal levels. An alert signal is broadcast that a section of a navigation map is not useable for navigation of a vehicle if changes in the current performance level of the bistatic signals exceeds the performance thresholds.

12 Claims, 8 Drawing Sheets

(51) Int. Cl.
*G01S 13/89* (2006.01)
*G01S 13/91* (2006.01)

(56) References Cited

U.S. PATENT DOCUMENTS

| | | | | |
|---|---|---|---|---|
| 10,404,387 | B1* | 9/2019 | Devison | H04B 17/309 |
| 10,989,805 | B2 | 4/2021 | Zwirn | |
| 11,096,026 | B2* | 8/2021 | Adare | H04W 4/46 |
| 11,274,930 | B1* | 3/2022 | Madhivanan | G01C 21/32 |
| 2006/0238407 | A1* | 10/2006 | Bourdelais | G01S 13/003 |
| | | | | 342/195 |
| 2009/0323544 | A1* | 12/2009 | Gaddis | H04L 45/02 |
| | | | | 370/252 |
| 2014/0087739 | A1* | 3/2014 | Weaver | H04W 16/18 |
| | | | | 455/436 |
| 2014/0372498 | A1* | 12/2014 | Mian | H04W 4/38 |
| | | | | 709/201 |
| 2020/0142047 | A1 | 5/2020 | Zwirn | |
| 2020/0296558 | A1* | 9/2020 | Adare | H04W 68/005 |
| 2021/0356582 | A1* | 11/2021 | Gapin | G01S 7/006 |
| 2022/0026550 | A1* | 1/2022 | Park | G01S 13/762 |
| 2022/0113400 | A1* | 4/2022 | Manolakos | G01S 7/006 |
| 2022/0126864 | A1* | 4/2022 | Moustafa | G06T 1/0007 |
| 2023/0062890 | A1* | 3/2023 | Van Sickle | G01C 21/387 |
| 2023/0104403 | A1* | 4/2023 | Erez | G01C 21/3848 |
| | | | | 701/409 |
| 2023/0320321 | A1* | 10/2023 | Hipsley | A01K 27/009 |
| | | | | 119/859 |

FOREIGN PATENT DOCUMENTS

| | | |
|---|---|---|
| WO | 2020250093 A1 | 12/2020 |
| WO | 2021230990 A1 | 11/2021 |

OTHER PUBLICATIONS

European Patent Office, "Extended European Search Report", from EP Application No. 22217024.3, from Foreign Counterpart to U.S. Appl. No. 17/576,711, filed Jun. 9, 2023, pp. 1 through 12, Published: EP.

European Patent Office, "Communication pursuant to Article 94(3)EPC", dated May 13, 2025, from EP Application No. 22217024.3, from Foreign Counterpart to U.S. Appl. No. 17/576,711, pp. 1 through 9, Published: EP.

* cited by examiner

GROUND MAP MONITOR FOR MAP-BASED, VISION NAVIGATION SYSTEMS

BACKGROUND

Vehicle map-based, vision navigation systems compute vehicle navigation solutions by correlating features in images taken from onboard vision based sensors with stationary ground based features in a priori maps. The performance of the map-based, vision navigation systems depends on the accuracy of the map, and that the map correctly depicts the current state of the ground features. Examples of vehicles that use map-based, vision navigation systems include Unmanned Air Systems (UAS) or Urban Air Mobility (UAM) vehicles.

Any changes in the real-world ground terrain/features require that such vehicles not use the map region nor rely on features in the map region with incorrect ground terrain/feature positions. Thus, there is a need for an indicator that features within the map are no longer usable for navigation, and for real-time map updates to reflect real-world feature changes.

SUMMARY

A ground map monitor method comprises obtaining positions, from a database, for a plurality of communication nodes in a communications network; selecting one or more transmission nodes and one or more reception nodes from the plurality of communication nodes; and measuring bistatic signals between the one or more transmission nodes and the one or more reception nodes to determine nominal signal performance characteristics for the bistatic signals, including reflected signal time delays, signal frequency shifts, and signal power levels. The method monitors the bistatic signals for changes to the nominal signal performance characteristics. The method uses discriminators between the nominal signal performance characteristics and a current performance level of the bistatic signals, and compares the discriminators against performance thresholds, to determine whether current signal performance characteristics have varied from their nominal levels. The performance thresholds are user selected for the reflected signal time delays, signal frequency shifts, and signal power levels. The method ignores instantaneous changes in the nominal signal performance characteristics, wherein a time period that a change is classified as instantaneous is a user selected time threshold. An alert signal is broadcast that a section of a navigation map is not useable for navigation of a vehicle if changes in the current performance levels of the bistatic signals exceeds the performance thresholds and the time threshold.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
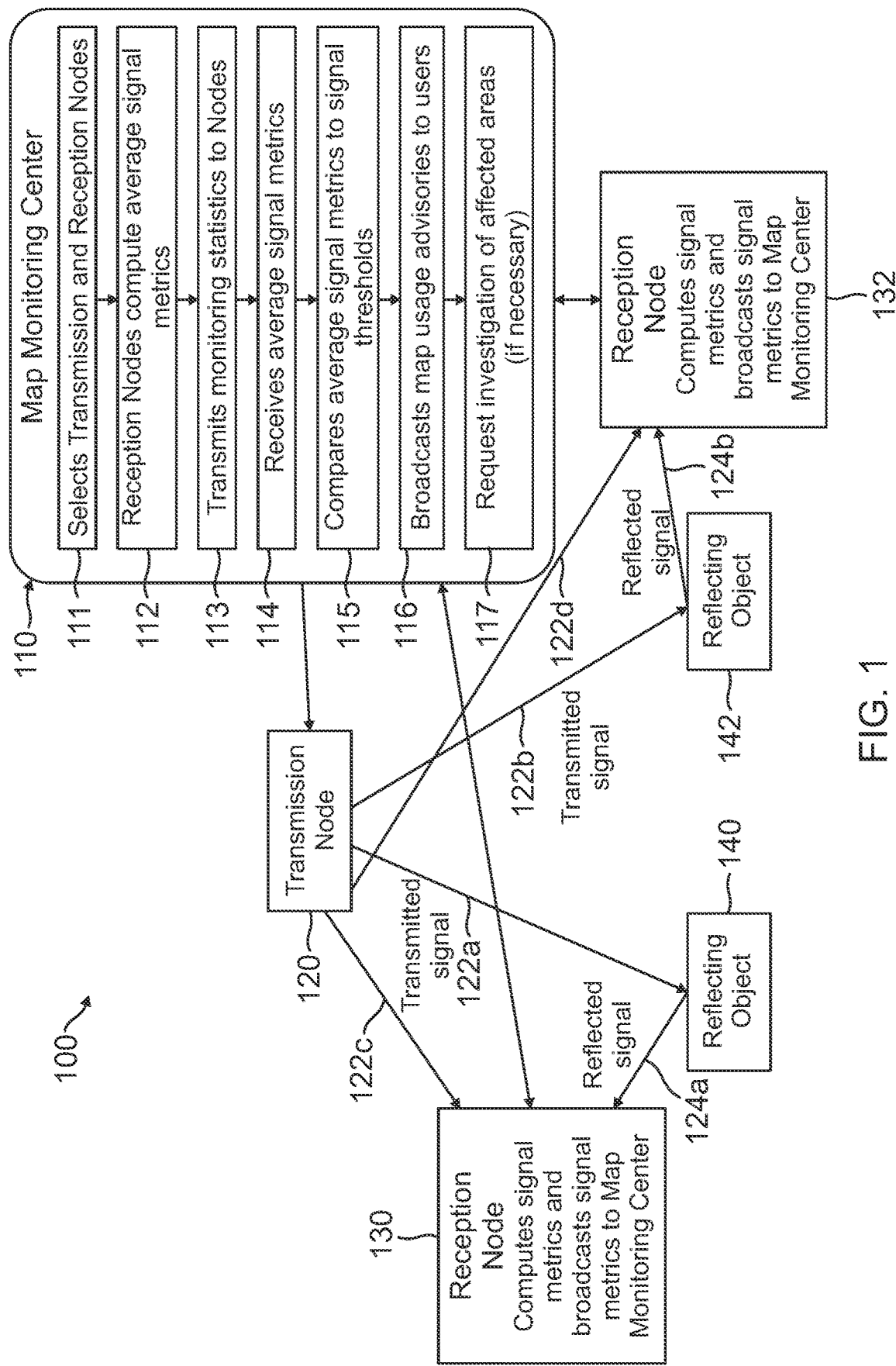
FIG. 1 is a block diagram of a ground map monitor system, according to an exemplary embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A ground map monitor for map-based, vision navigation systems using signals from a communications network, is described herein. The present approach monitors the maps used for map-based, vision navigation systems, by using a communications network, such as a fifth generation (5G) network or other future network, where the signals transmitted and received by the network nodes are used as a bistatic radar. During operation, changes to such bistatic signals from nominal signal conditions indicate changes to the ground terrain/features, such that the map requires an update.

Any changes to ground terrain/features from what was originally on a navigation map can severely impair the operational range of safety critical applications, such as the navigation range of air vehicles that employ map-based, vision navigation systems. The present approach aids in overcoming these safety issues, allowing such air vehicles to be operated safely through the intended operational range.

Exemplary air vehicles that can use the present ground map monitor include Advanced Air Mobility (AAM) vehicles, Unmanned Air Systems (UAS), Urban Air Mobility (UAM) vehicles, vertical take-off and landing (VTOL) vehicles, Unmanned Aerial Vehicles (UAVs), or the like.

Bistatic radar has been used in multiple applications, but has not been used with communication networks, such as a 5G networks, to verify the positions of ground terrain/features in a map for navigation. Real-time map verification is one of the barriers to entry for certified navigation systems, and real-time monitors of the map features would help enable these navigation systems to be used in safety critical applications, such as UAM vehicles for air taxis, and UAS for cargo delivery.

In one exemplary approach for a ground map monitor using a 5G network, various 5G node positions are established on a navigation map, and various 5G transmission and reception nodes are also established. Repeated measurements of bistatic 5G signals are carried out during a map verification time period to establish nominal performance signal characteristics, including reflected signal time delays, signal frequency shifts, and signal power levels. The bistatic reflected signals are then monitored for changes to the nominal performance signal characteristics.

The ground map monitor uses discriminators between nominal and current signal performance levels and compares them against thresholds to establish whether the current signal performance characteristics have varied from their nominal levels. The thresholds can be user selected for the reflected signal time delays, signal frequency shifts, and signal power levels. The ground map monitor ignores instantaneous changes in the nominal signal performance characteristics, where the time period a change is classified as instantaneous can be a user specified threshold. For changes in the reflected signal characteristics that exceed their performance and time thresholds, the 5G network broadcasts an alert to local users/operators, ground stations, or unmanned aircraft system traffic management (UTM) systems, that a section of the navigation map is not useable for navigation.

Further details related to the present system and method are described as follows and with reference to the drawings.

FIG. 1 illustrates a ground map monitor system 100, according to an exemplary embodiment. The ground map monitor system 100 can be implemented using a communications node network, such as a 5G node network. As described in greater detail hereafter, the nodes are configured to monitor ground feature changes using reflected signals. The ground map monitor system 100 can be used by various air vehicles having map-based, vision navigation systems, such as UAM and UAS vehicles.

As shown in FIG. 1, the ground map monitor system 100 includes a map monitoring center 110, which can be located at any node with access to network signals within the region specified by the map or at a central location with access to all network signals. The map monitoring center 110 performs various functions, including selection of the transmission and reception nodes (block 111) used to monitor one or more navigation maps, and instructing the reception nodes to compute average signal metrics (block 112). The map monitoring center 110 also transmits monitoring statistics to the nodes (block 113).

In the example shown in FIG. 1, map monitoring center 110 has selected a transmission node 120, such as a transmitting 5G node, and reception nodes 130 and 132, such as receiving 5G nodes. A transmitted signal 122a from transmission node 120 is received at a reflecting object 140, which reflects a signal 124a toward reception node 130. Likewise, a transmitted signal 122b from transmission node 120 is received at a reflecting object 142, which reflects a signal 124b toward reception node 132. In addition, transmission node 120 can broadcast a direct line-of-site signal 122c toward reception node 130, and a direct line-of-site signal 122d toward reception node 132.

The reflected signal 124a and/or line-of-site signal 122c are received by reception node 130, which computes three average signal metrics, including the signal time delay, signal frequency shift, and signal power level. The signal metrics are then broadcast from reception node 130 to map monitoring center 110 for further processing. Likewise, the reflected signal 124b and/or line-of-site signal 122d are received by reception node 132, which computes three average signal metrics (time delay, frequency shift, and power level). The signal metrics are then broadcast from reception node 132 to map monitoring center 110 for further processing.

The map monitoring center 110 receives the average signal metrics from reception nodes 130 and 132 (block 114), and compares the average signal metrics to signal thresholds (block 115). The map monitoring center 110 then broadcasts map usage advisories to various users of ground map monitor system 100 (block 116). If necessary, a request for investigation of affected map areas can be sent to one or more of the users (block 117).

Network nodes such as 5G nodes, placed in urban or rural environments, can be mounted close to the ground, and on top of or the sides of buildings, towers, traffic poles, or the like. Such network nodes are stationary with known positions. Therefore, a network signal such as a 5G signal transmitted from one node, reflected from the ground/terrain features, and received at a second node should have constant (or, nominal) time delay, frequency shift, and power levels. Constant deviations from the nominal time delay, frequency shift, and power level signals received by the receiving node indicate changes in the ground/terrain features. Instantaneous deviations from the nominal time delay, frequency shift, and power levels received by the receiving node could be due to temporary disturbances to the network signal or a vehicle driving by a ground/terrain feature.

Figure 2:
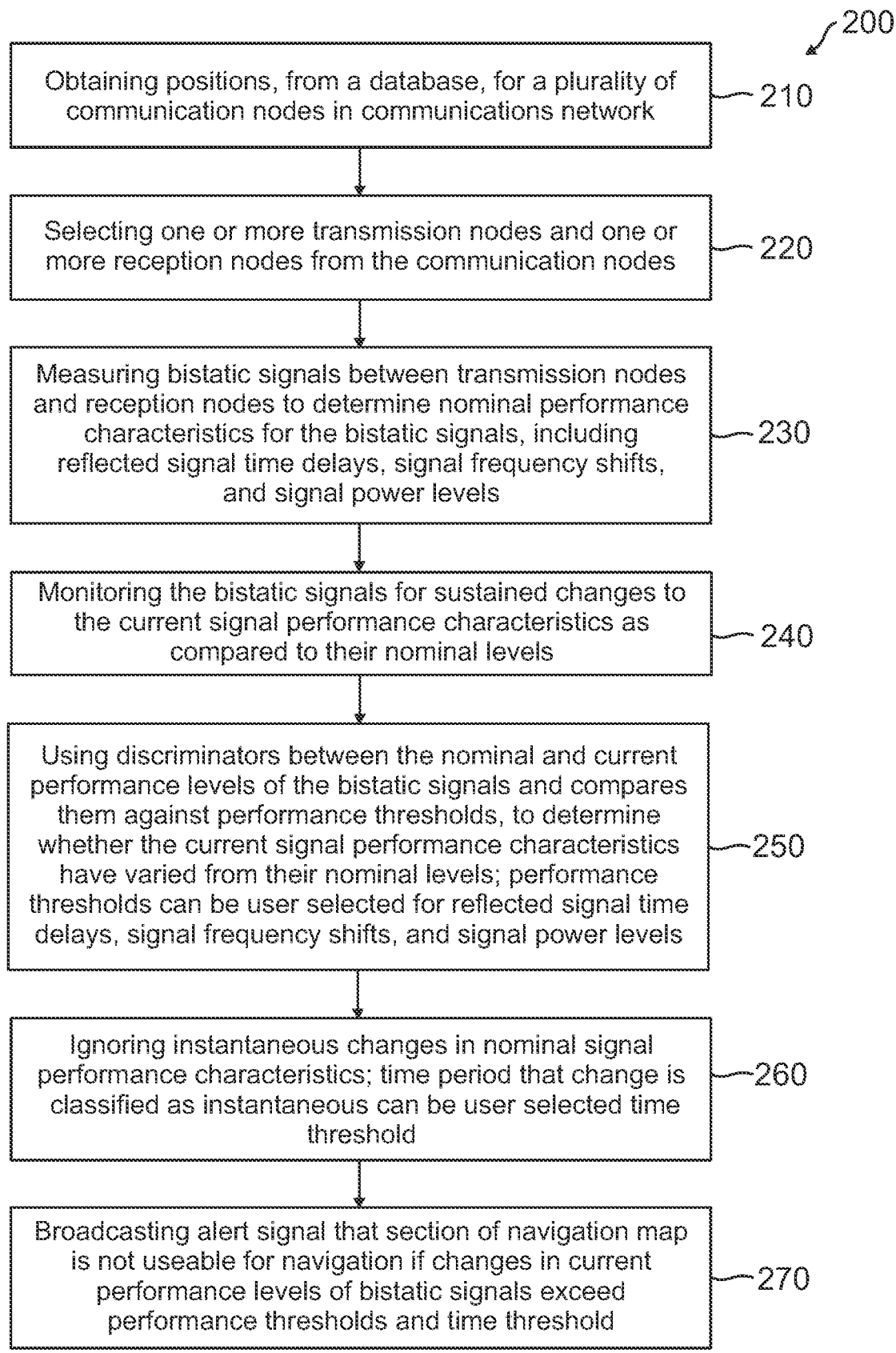
FIG. 2 is a flow diagram of a ground map monitor method, according to an exemplary implementation.

FIG. 2 is a flow diagram of a ground map monitor method 200, according to an exemplary implementation and providing further details. Initially, method 200 obtains position information, from a database, for a plurality of communication nodes in a communications network (block 210), such as a 5G network. Next, method 200 selects one or more transmission nodes and one or more reception nodes from the communication nodes (block 220), such as 5G transmission and reception nodes. The method 200 measures bistatic signals between the transmission nodes and the reception nodes to determine the nominal signal performance characteristics for the bistatic signals, including reflected signal time delays, signal frequency shifts, and signal power levels (block 230). The method 200 then monitors the bistatic signals for sustained changes to the current signal performance characteristics as compared to their nominal levels (block 240).

The method 200 uses discriminators between the nominal and current performance levels of the bistatic signals and compares them against performance thresholds, to determine whether the current signal performance characteristics have varied from their nominal levels (block 250). The performance thresholds can be user selected for the reflected signal time delays, signal frequency shifts, and signal power levels. The method 200 ignores instantaneous changes in the nominal signal performance characteristics, wherein the time period that a change is classified as instantaneous can be a user selected time threshold (block 260). The method 200 broadcasts an alert signal that a section of a navigation map is not useable for navigation by a vehicle if changes in the current performance levels of the bistatic signals exceed the performance thresholds and the time threshold (block 270).

Figure 3A:
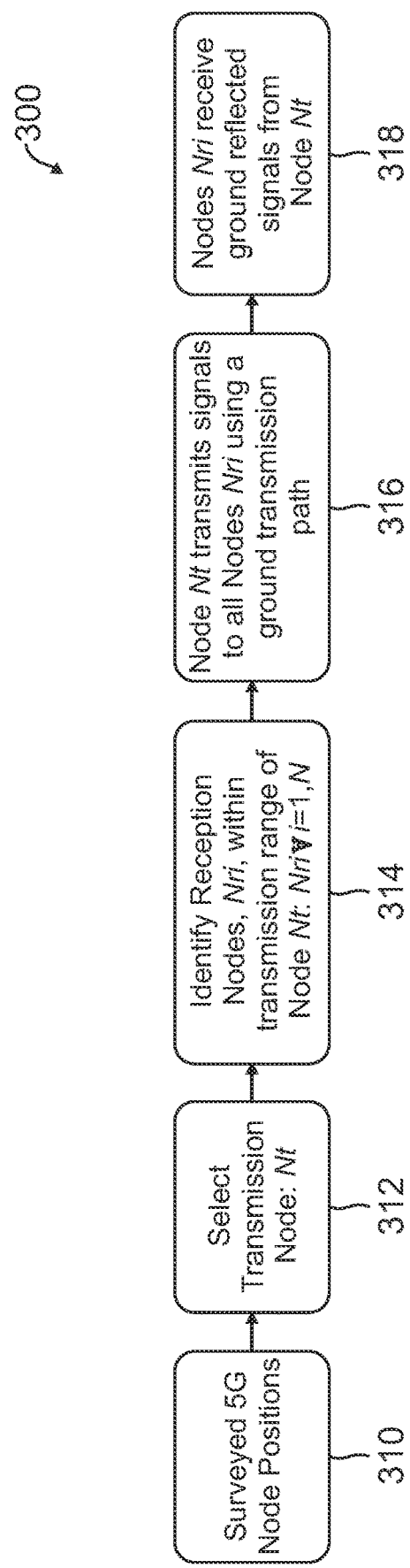
FIGS. 3A-3C are flow diagrams for a ground map monitor method using a 5G node network.
Figure 3B:
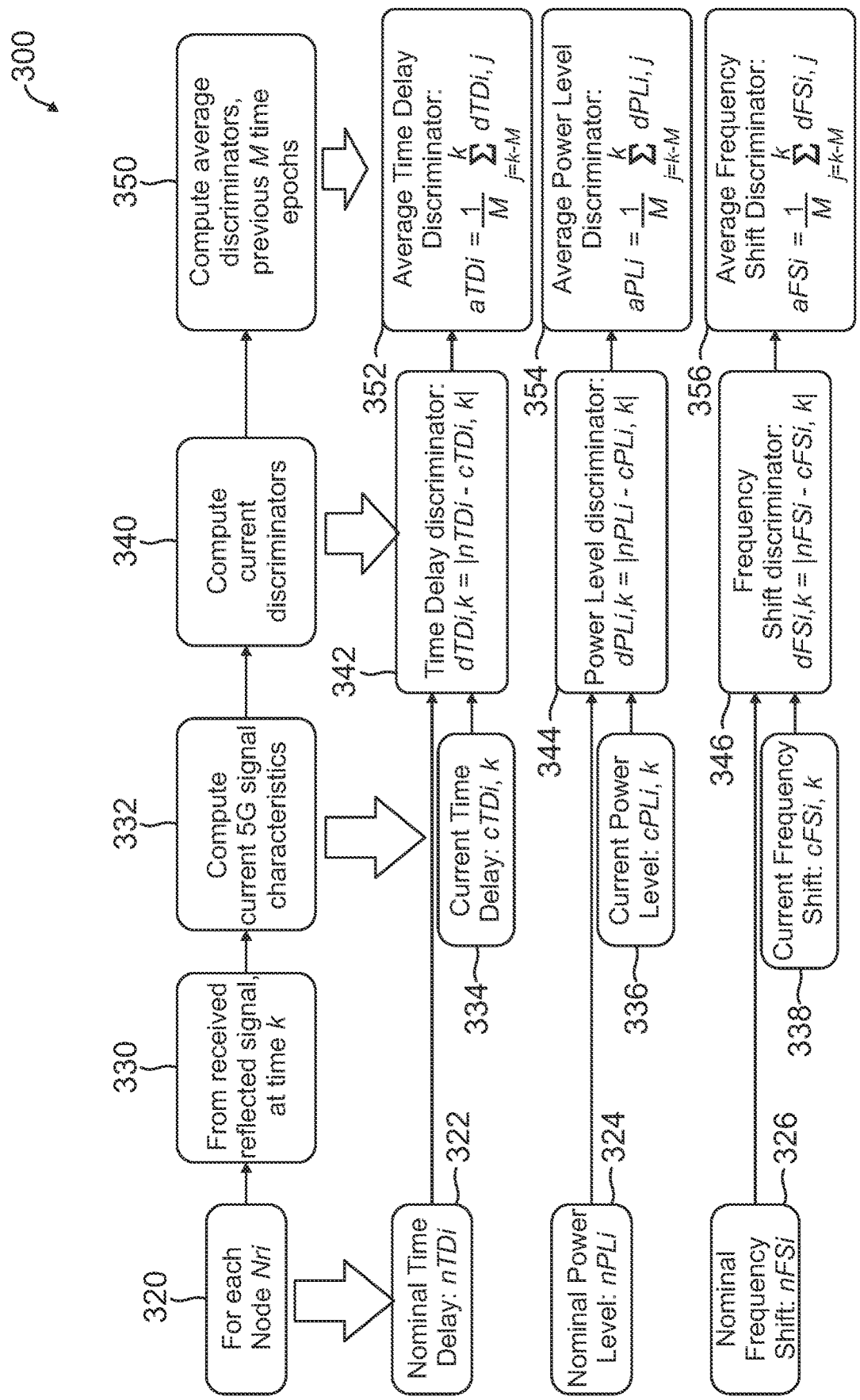
Figure 3C:
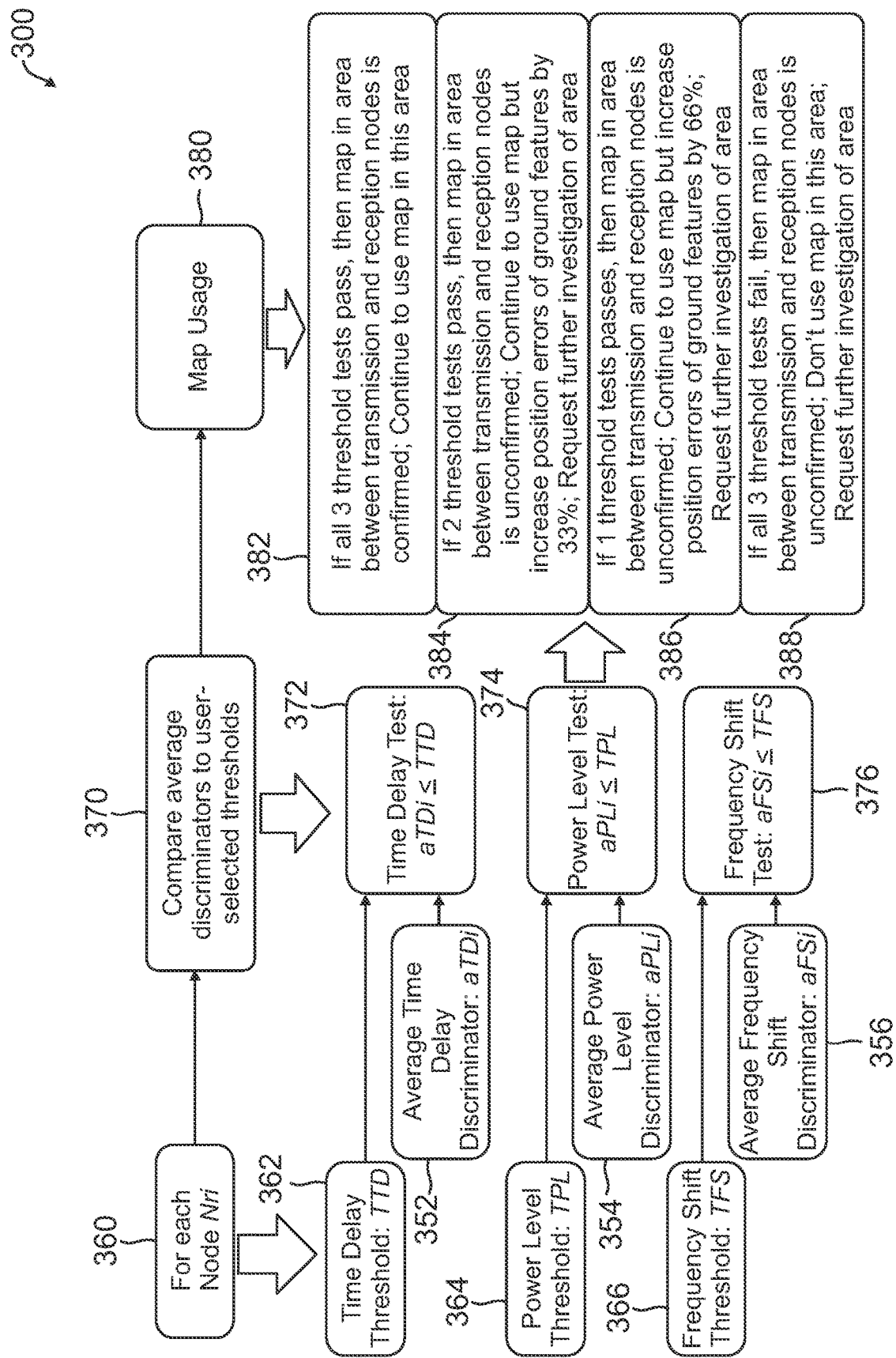

FIGS. 3A-3C are flow diagrams that provide additional details for implementing a ground map monitor method 300 using a 5G node network. As shown in FIG. 3A, method 300 initially provides surveyed 5G node positions in a given area (block 310), and selects a transmission node Nt from the surveyed 5G node positions (block 312). Next, method 300 identifies one or more reception nodes Nri, within transmission range of the transmission node Nt, expressed as: $Nri \forall i=1,N$ (block 314). The transmission node Nt transmits signals to all reception nodes Nri using a ground transmission path (block 316), and the reception nodes Nri receive ground reflected signals from the transmission node Nt (block 318).

As shown in FIG. 3B, for each reception node Nri (block 320), method 300 provides nominal 5G signal characteristics, including a nominal time delay: $nTDi$ (block 322); a nominal power level: $nPLi$ (block 324); and a nominal frequency shift: $nFSi$ (block 326). From a received reflected signal, at time k (block 330), method 300 computes current 5G signal characteristics (block 332), including a current time delay: $cTDi,k$ (block 334); a current power level: $cPLi,k$ (block 336); and a current frequency shift: $cFSi,k$ (block 338). The method 300 then computes current discriminators (block 340), based on the nominal and current signal characteristics. A time delay discriminator at each time k is computed as: dTDi,k=|nTDi−cTDi,k| (block 342). A power level discriminator at each time k is computed as: dPLi,k=|nPLi−cPLi,k| (block 344). A frequency shift discriminator at each time k is computed as: dFSi,k=|nFSi−cFSi,k| (block 346).

As further depicted in FIG. 3B, method 300 then computes average discriminators, based on previous M time epochs (block 350) where M is a user-selected time period, or threshold. An average time delay discriminator aTDi (block 352) can be expressed as:

$$aTDi = \frac{1}{M} \sum_{j=k-M}^{k} dTDi, j.$$

An average power level discriminator aPLi (block 354) can be expressed as:

$$aPLi = \frac{1}{M} \sum_{j=k-M}^{k} dPLi, j.$$

An average frequency shift discriminator aFSi (block 356) can be expressed as:

$$aFSi = \frac{1}{M} \sum_{j=k-M}^{k} dFSi, j.$$

As shown in FIG. 3C, for each reception node Nri (block 360), method 300 provides user-selected thresholds, including a time delay threshold: TTD (block 362); a power level threshold: TPL (block 364); and a frequency shift threshold: TFS (block 366). The method 300 then compares the average discriminators to the user-selected thresholds (block 370) in various threshold tests. For example, the average time delay discriminator aTDi (from block 352) is compared to the time delay threshold TTD (from block 362) in a time delay threshold test to determine if: aTDi≤TTD (block 372). The average power level discriminator aPLi (from block 354) is compared to the power level threshold TPL (from block 364) in a power level threshold test to determine if: aPLi≤TPL (block 374). The average frequency shift discriminator aFSi (from block 356) is compared to the frequency shift threshold TFS (from block 366) in a frequency shift threshold test to determine if: aFSi≤TFS (block 376).

As further depicted in FIG. 3C, method 300 considers the results of the various threshold tests in determining map usage (block 380). If all three threshold tests pass (time delay, power level, frequency shift), then the map in the area between the transmission and reception nodes is confirmed (block 382). In this case, an advisory is broadcast to continue use of the map in this area. If two of the three threshold tests pass, then the map in the area between the transmission and reception nodes is unconfirmed (block 384). An advisory is broadcast to continue use of the map, but to increase the position errors of ground features by 33%. A request can also be sent for further investigation of the area. If only one threshold test passes, then the map in the area between the transmission and reception nodes is unconfirmed (block 386). An advisory is broadcast to continue use of the map, but to increase the position errors of ground features by 66%. A request can also be sent for further investigation of the area. If all three threshold tests fail, then the map in the area between the transmission and reception nodes is unconfirmed (block 388). An advisory is broadcast to not use the map in this area. A request can also be sent to one or more monitors such as a Unmanned Aircraft System Traffic Management System (UTM) for further investigation of the area.

Figure 4A:
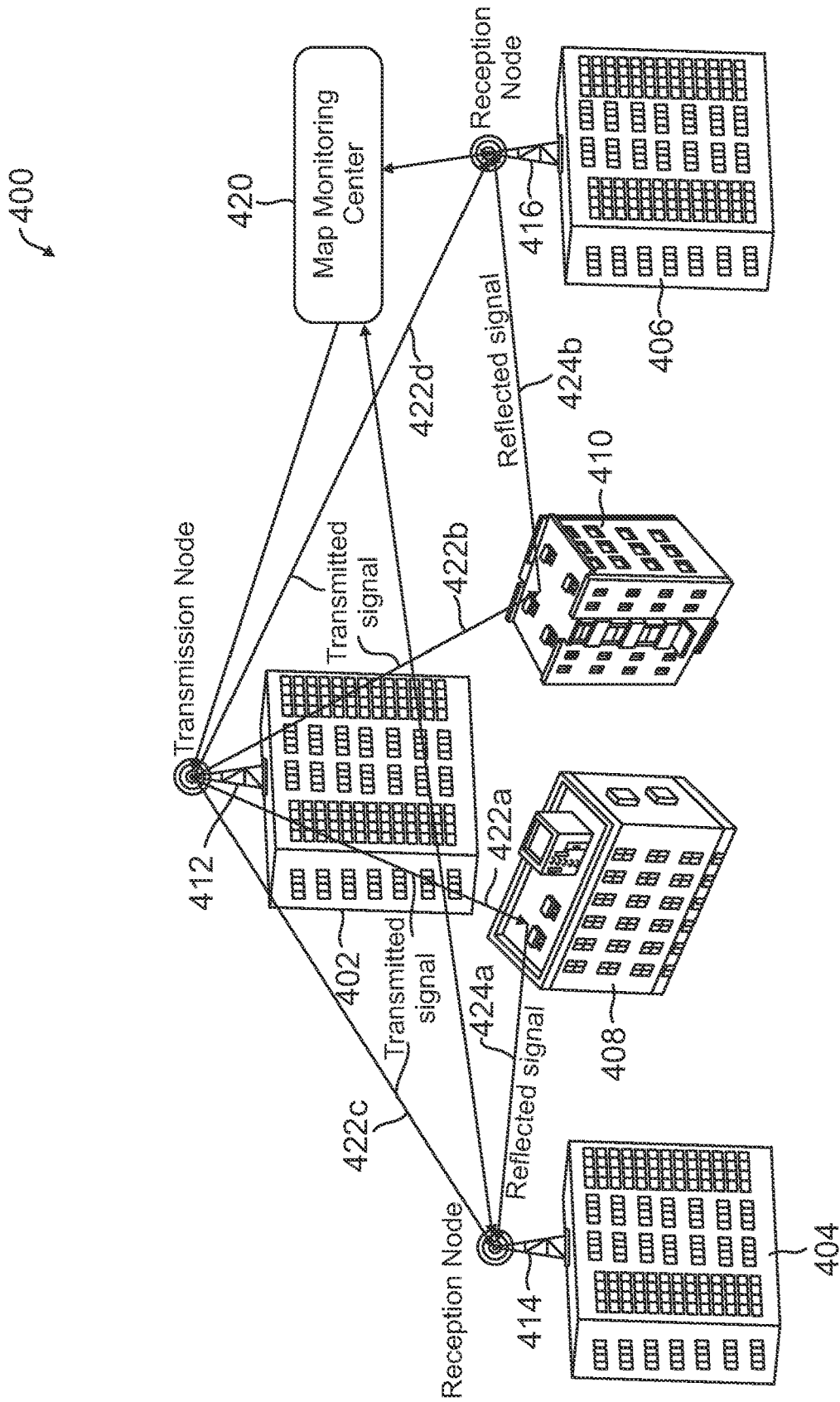
FIGS. 4A and 4B are schematic diagrams of example operations of a ground map monitor system, using a communications network in an urban environment.
Figure 4B:
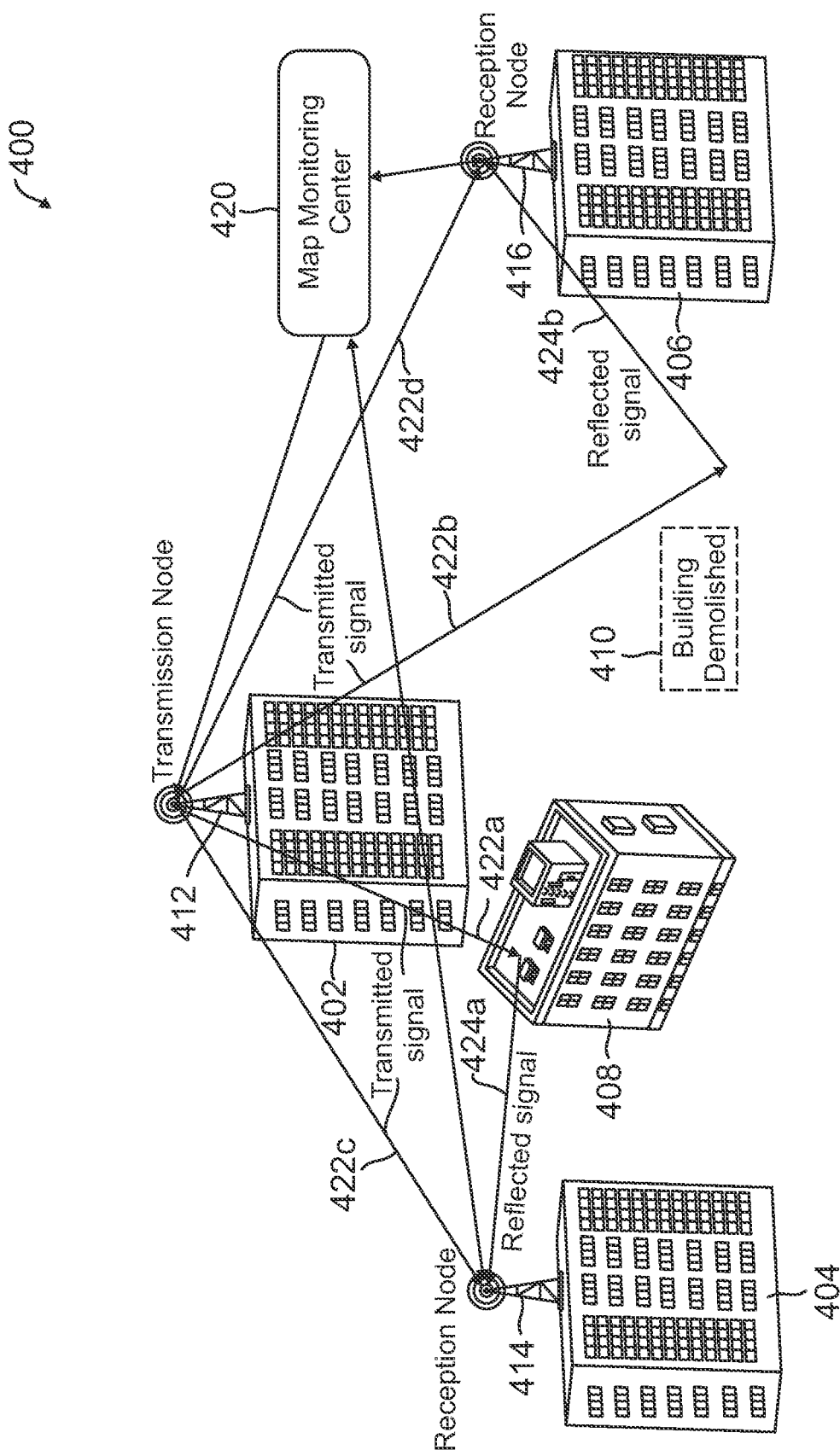

FIGS. 4A and 4B show an example of the operation of a ground map monitor system 400 using a communications network, such as a 5G node network, in an urban environment. In this example, the urban environment includes a plurality of buildings 402, 404, 406, 408, and 410. A cellular tower 412 is located on top of building 402, a cellular tower 414 is located on top of building 404, and a cellular tower 416 is located on top of building 406. The ground map monitor system 400 includes a map monitoring center 420, which performs various functions as described previously. Bistatic signals between the transmission nodes and reception nodes are constantly measured to establish nominal condition performance characteristics, including reflected signal time delay, signal frequency shift, and signal power levels, for the urban environment shown in FIGS. 4A and 4B.

In this example, map monitoring center 420 has selected cellular tower 412 as a transmission node, and cellular towers 414 and 416 as reception nodes. A transmitted signal 422a from cellular tower 412 (transmission node) is received at building 408, which reflects a signal 424a toward cellular tower 414 (reception node). Likewise, a transmitted signal 422b from cellular tower 412 is received at building 410, which reflects a signal 424b toward cellular tower 416 (reception node). In addition, cellular tower 412 can broadcast a direct line-of-site signal 422c toward cellular tower 414, and a direct line-of-site signal 422d toward cellular tower 416.

The reflected signal 424a and/or line-of-site signal 422c are received by the reception node located at cellular tower 414, which computes three average signal metrics, including the signal time delay, signal frequency shift, and signal power level. The signal metrics are then broadcast from the reception node located at cellular tower 414 to map monitoring center 420 for further processing. Likewise, the reflected signal 424b and/or line-of-site signal 422d are received by the reception node located at cellular tower 416, which computes three average signal metrics (time delay, frequency shift, and power level). The signal metrics are then broadcast from the reception node located at cellular tower 416 to map monitoring center 420 for further processing.

The map monitoring center 420 monitors the bistatic signal discriminators for changes to the nominal signal performance characteristics. For example, map monitoring center 420 receives the average signal discriminators from the reception nodes, and compares the average signal discriminators to signal thresholds.

As shown in FIG. 4B, a changed condition has occurred when building 410 has been demolished. Thus, map monitoring center 420 would detect changes to the nominal signal performance characteristics, and then broadcast navigation map usage advisories to various users. The map monitoring center 420 can also request one or more monitors such as a Unmanned Aircraft System Traffic Management System (UTM) for further investigation of the affected urban environment.

Figure 5A:
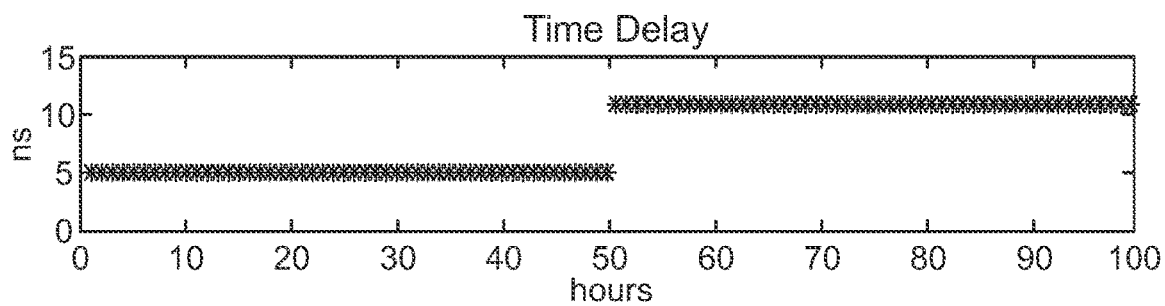
FIGS. 5A-5C are graphical representations showing an example observation change in performance characteristics, as would be detected by a map monitoring center in an urban environment.
Figure 5B:
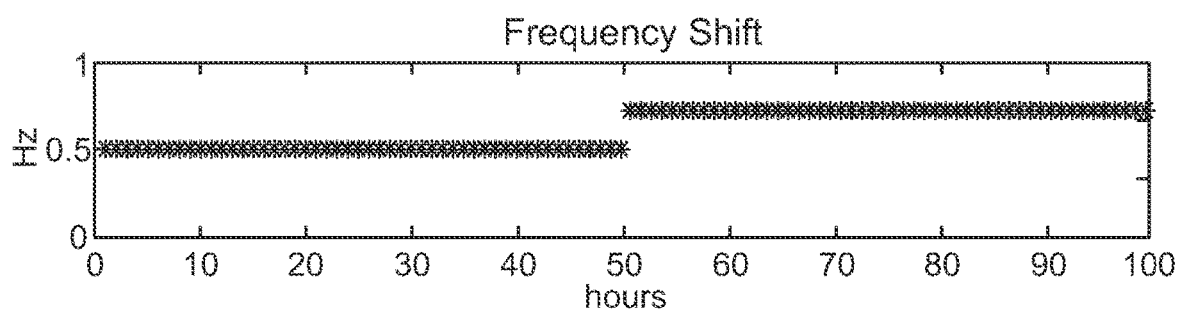
Figure 5C:
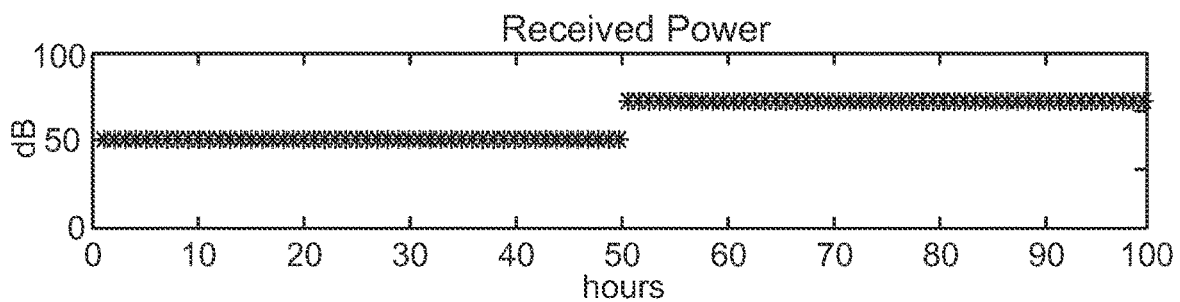

FIGS. 5A-5C are graphical representations showing an example change in signal performance characteristics, as would be detected by a map monitoring center in an urban environment. This example assumes a detected change in the urban environment, such as a demolished building, at hour 50. FIG. 5A shows the change in time delay at hour 50, FIG. 5B shows the change in frequency shift at hour 50, and FIG. 5C shows the change in received power at hour 50. As indicated, the metrics of time delay, frequency shift, and received power all shift upward at hour 50. Assuming these changes in the metrics exceed performance and time thresholds, the map monitoring center would broadcast an alert to local users/operators, ground stations, and others that a section of the navigation map corresponding to the urban environment is not useable for navigation.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method comprising: obtaining positions, from a database, for a plurality of communication nodes in a communications network; selecting one or more transmission nodes and one or more reception nodes from the plurality of communication nodes; measuring bistatic signals between the one or more transmission nodes and the one or more reception nodes to determine nominal signal performance characteristics for the bistatic signals, including reflected signal time delays, signal frequency shifts, and signal power levels; monitoring the bistatic signals for changes to the nominal signal performance characteristics; using a discriminator between the nominal signal performance characteristics and a current performance level of the bistatic signals, and comparing the discriminator against a performance threshold, to determine whether current signal performance characteristics have varied from their nominal levels, wherein the performance threshold is user selected for the reflected signal time delays, signal frequency shifts, and signal power levels; ignoring instantaneous changes in the nominal signal performance characteristics, wherein a time period that a change is classified as instantaneous is a user selected time threshold; and broadcasting an alert signal that a section of a navigation map is not useable for navigation of a vehicle if changes in the current performance level of the bistatic signals exceeds the performance threshold and the time threshold.

Example 2 includes the method of Example 1, wherein the communication nodes are 5G network nodes.

Example 3 includes the method of any of Examples 1-2, wherein the navigation map is employed in a map-based, vision navigation system in an aerial vehicle.

Example 4 includes the method of Example 3, wherein the aerial vehicle comprises an Advanced Air Mobility (AAM) vehicle, an Unmanned Air Systems (UAS) vehicle, an Urban Air Mobility (UAM) vehicle, a vertical take-off and landing (VTOL) vehicle, or an Unmanned Aerial Vehicle (UAV).

Example 5 includes the method of any of Examples 1-4, wherein constant deviations from the nominal signal performance characteristics for the bistatic signals indicate one or more changes to ground/terrain features.

Example 6 includes a ground map monitor system, comprising: at least one transmission node and a plurality of reception nodes selected from a plurality of communication nodes in a communications network; and a map monitoring center including at least one processor operative to: measure bistatic signals between the at least one transmission node and the reception nodes to determine nominal signal performance characteristics for the bistatic signals, including a reflected signal time delay, signal frequency shift, and signal power level; monitor the bistatic signals for changes to the nominal signal performance characteristics; use a discriminator between the nominal signal performance characteristics and a current performance level of the bistatic signals, and compare the discriminator against a performance threshold, to determine whether current signal performance characteristics have varied from their nominal levels; and broadcast an alert signal that a section of a navigation map is not useable for navigation of a vehicle if changes in the current performance level of the bistatic signals exceeds the performance threshold.

Example 7 includes the ground map monitor system of Example 6, wherein: the communication nodes are 5G network nodes; and the navigation map is employed in a map-based, vision navigation system in an aerial vehicle.

Example 8 includes the ground map monitor system of any of Examples 6-7, wherein the performance threshold is user selected for the reflected signal time delay, signal frequency shift, and signal power level.

Example 9 includes the ground map monitor system of any of Examples 6-8, wherein the at least one processor is further operative to: ignore instantaneous changes in the nominal signal performance characteristics, wherein a time period that a change is classified as instantaneous is a user selected time threshold.

Example 10 includes the ground map monitor system of any of Examples 6-9, wherein the at least one processor is further operative to: send a request to one or more monitors to investigate a ground area corresponding to the section of the navigation map that is not useable for navigation.

Example 11 includes the ground map monitor system of Example 10, wherein the one or more monitors include a Unmanned Aircraft System Traffic Management System (UTM).

Example 12 includes a ground map monitor method comprising: obtaining positions for a plurality of communication nodes in a communications network; selecting a transmission node from the communication nodes; identifying one or more reception nodes from the communication nodes that are within a transmission range of the transmission node; transmitting signals from the transmission node to the reception nodes; receiving signals at the reception nodes based on the signals from the transmission node; for each of the reception nodes, determining nominal signal performance characteristics for the received signals, including a nominal time delay, a nominal power level, and a nominal frequency shift; for each of the received signals, at time k, the method further comprising: computing current signal characteristics, including a current time delay, a current power level, and a current frequency shift; computing current discriminators, based on the nominal signal characteristics and the current signal characteristics, including a time delay discriminator, a power level discriminator, and a frequency shift discriminator; and computing average discriminators, based on previous M time epochs, including an average time delay discriminator, an average power level discriminator, and an average frequency shift discriminator; for each of the reception nodes, the method further comprising: providing user-selected thresholds, including a time delay threshold, a power level threshold, and a frequency shift threshold; comparing the average discriminators to the user-selected thresholds using a time delay threshold test, a power level threshold test, and a frequency shift threshold test; and analyzing results from the threshold tests to determine appropriate usage of a navigation map.

Example 13 includes the ground map monitor method of Example 12, wherein the communication nodes are 5G network nodes.

Example 14 includes the ground map monitor method of any of Examples 12-13, wherein: the time delay discriminator, at time k, is computed as a difference between the nominal time delay and the current time delay; the power level discriminator, at time k, is computed as a difference between the nominal power level and the current power level; and the frequency shift discriminator, at time k, is computed as a difference between the nominal frequency shift and the current frequency shift.

Example 15 includes the ground map monitor method of any of Examples 12-14, wherein: the average time delay discriminator, aTDi, is defined by:

$$aTDi = \frac{1}{M}\sum_{j=k-M}^{k} dTDi, j;$$

the average power level discriminator, aPLi, is defined by:

$$aPLi = \frac{1}{M}\sum_{j=k-M}^{k} dPLi, j;$$

and the average frequency shift discriminator, aFSi, is defined by:

$$aFSi = \frac{1}{M}\sum_{j=k-M}^{k} dFSi, j.$$

Example 16 includes the ground map monitor method of any of Examples 12-15, wherein: the time delay threshold test compares the average time delay discriminator to the time delay threshold, wherein the time delay threshold test is passed when the average time delay discriminator is less than or equal to the time delay threshold; the power level threshold test compares the average power level discriminator to the power level threshold, wherein the power level threshold test is passed when the average power level discriminator is less than or equal to the power level threshold; and the frequency shift threshold test compares the average frequency shift discriminator to the frequency shift threshold, wherein the frequency shift threshold test is passed when the average frequency shift discriminator is less than or equal to the frequency shift threshold.

Example 17 includes the ground map monitor method of Example 16, wherein if all three of the threshold tests are passed, the navigation map of an area between the transmission node and the reception nodes is confirmed for use, and an advisory is broadcast to users to continue use of the navigation map.

Example 18 includes the ground map monitor method of Example 16, wherein if two of the three threshold tests are passed, the navigation map of an area between the transmission node and the reception nodes is unconfirmed for use, and an advisory is broadcast to users to continue use of the navigation map, but to increase position errors of ground features by a first percentage.

Example 19 includes the ground map monitor method of Example 16, wherein if one of the three threshold tests are passed, the navigation map of an area between the transmission node and the reception nodes is unconfirmed for use, and an advisory is broadcast to users to continue use of the navigation map, but to increase position errors of ground features by a second percentage that is greater than the first percentage.

Example 20 includes the ground map monitor method of Example 16, wherein if all three of the threshold tests fail, the navigation map of an area between the transmission node and the reception nodes is unconfirmed for use, and an advisory is broadcast to users to not use the navigation map of the area.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:
providing a ground map monitor system that monitors for changes to ground/terrain features shown in a navigation map, the ground map monitor system including at least one processor that performs a process comprising:
obtaining positions, from a database, for a plurality of communication nodes in a communications network;
selecting one or more transmission nodes and one or more reception nodes from the plurality of communication nodes;
measuring bistatic signals between the one or more transmission nodes and the one or more reception nodes to determine nominal signal performance characteristics for the bistatic signals, including one or more of reflected signal time delays, signal frequency shifts, or signal power levels;
monitoring the bistatic signals for changes to the nominal signal performance characteristics;
using a discriminator between the nominal signal performance characteristics and a current performance level of the bistatic signals, and comparing the discriminator against a performance threshold, to determine whether current signal performance characteristics have varied from their nominal levels, wherein the performance threshold is user selected for the one or more of reflected signal time delays, signal frequency shifts, or signal power levels;
ignoring instantaneous changes in the nominal signal performance characteristics, wherein a time period that a change is classified as instantaneous is a user selected time threshold; and
broadcasting an alert signal that a section of the navigation map is not useable for navigation of a vehicle if changes in the current performance level of the bistatic signals exceeds the performance threshold and the time threshold.

2. The method of claim 1, wherein the communication nodes are 5G network nodes.

3. The method of claim 1, wherein the navigation map is employed in a map-based, vision navigation system in an aerial vehicle.

4. The method of claim 3, wherein the aerial vehicle comprises an Advanced Air Mobility (AAM) vehicle, an Unmanned Air Systems (UAS) vehicle, an Urban Air Mobility (UAM) vehicle, a vertical take-off and landing (VTOL) vehicle, or an Unmanned Aerial Vehicle (UAV).

5. The method of claim 1, wherein constant deviations from the nominal signal performance characteristics for the bistatic signals indicate one or more changes to the ground/terrain features shown in the navigation map.

6. A ground map monitor system, comprising:
at least one transmission node and a plurality of reception nodes, selected from a plurality of communication nodes in a communications network, wherein the communication nodes are stationary cellular network nodes with known positions; and
a map monitoring center configured to monitor for changes to ground terrain/features shown in a navigation map, the map monitoring center including at least one processor that performs a process comprising:
measure bistatic signals between the at least one transmission node and the reception nodes to determine nominal signal performance characteristics for the bistatic signals, including one or more of a reflected signal time delay, signal frequency shift, or signal power level;
monitor the bistatic signals for changes to the nominal signal performance characteristics;
use a discriminator between the nominal signal performance characteristics and a current performance level of the bistatic signals, and compare the discriminator against a performance threshold, to determine whether current signal performance characteristics have varied from their nominal levels; and
broadcast an alert signal that a section of the navigation map is not useable for navigation of a vehicle if changes in the current performance level of the bistatic signals exceeds the performance threshold.

7. The ground map monitor system of claim 6, wherein:
the communication nodes are 5G network nodes; and
the navigation map is employed in a map-based, vision navigation system in an aerial vehicle.

8. The ground map monitor system of claim 6, wherein the performance threshold is user selected for the reflected signal time delay, signal frequency shift, or signal power level.

9. The ground map monitor system of claim 6, wherein the at least one processor is further operative to:
ignore instantaneous changes in the nominal signal performance characteristics, wherein a time period that a change is classified as instantaneous is a user selected time threshold.

10. The ground map monitor system of claim 6, wherein the at least one processor is further operative to:
send a request to one or more monitors to investigate a ground area corresponding to the section of the navigation map that is not useable for navigation.

11. The ground map monitor system of claim 10, wherein the one or more monitors include a Unmanned Aircraft System Traffic Management System (UTM).

12. The ground map monitor system of claim 6, wherein the cellular network nodes are mounted on ground, mounted on buildings, mounted on towers, or mounted on traffic poles.

* * * * *